US010997625B1

(12) United States Patent
Cohen-Tidhar et al.

(10) Patent No.: US 10,997,625 B1
(45) Date of Patent: May 4, 2021

(54) SYSTEM, DEVICE, AND METHOD FOR DETERMINING PREDICTED ANNOYANCE LEVEL OF MULTIMEDIA CONTENT

(71) Applicant: CLOUDINARY LTD., Petah Tikva (IL)

(72) Inventors: Amnon Cohen-Tidhar, Zoran (IL); Tal Lev-Ami, Modiin (IL)

(73) Assignee: CLOUDINARY LTD., Petah Tikva (IL)

( * ) Notice: Subject to any disclaimer, the term of this patent is extended or adjusted under 35 U.S.C. 154(b) by 0 days.

(21) Appl. No.: 16/709,937

(22) Filed: Dec. 11, 2019

(51) Int. Cl.
*G06Q 30/02* (2012.01)
*H04N 21/2668* (2011.01)
*H04N 21/234* (2011.01)

(52) U.S. Cl.
CPC ..... *G06Q 30/0245* (2013.01); *G06Q 30/0277* (2013.01); *H04N 21/23424* (2013.01); *H04N 21/2668* (2013.01)

(58) Field of Classification Search
CPC ........... G06Q 30/0245; G06Q 30/0277; H04N 21/2668; H04N 21/23424
See application file for complete search history.

(56) References Cited

U.S. PATENT DOCUMENTS

| 8,843,959 | B2* | 9/2014 | McMaster | .......... | H04N 7/17318 |
| | | | | | 725/40 |
| 8,947,539 | B2* | 2/2015 | Lee | ....................... | H04N 17/004 |
| | | | | | 348/193 |
| 9,218,101 | B2* | 12/2015 | Fleischman | ............. | G06F 16/26 |
| 10,298,985 | B2* | 5/2019 | Kalagi | ............. | H04N 21/23439 |
| 2010/0188580 | A1* | 7/2010 | Paschalakis | .......... | G06F 16/785 |
| | | | | | 348/571 |
| 2011/0196733 | A1* | 8/2011 | Li | .......................... | G06Q 30/02 |
| | | | | | 705/14.42 |
| 2013/0091515 | A1* | 4/2013 | Sakata | ............... | H04N 21/4223 |
| | | | | | 725/10 |
| 2014/0176708 | A1* | 6/2014 | Ramakrishnan | ....... | G06K 9/624 |
| | | | | | 348/143 |

(Continued)

OTHER PUBLICATIONS

A Quick Algorithm to Search and Detect Video Shot Changes International Journal of Computer Applications (0975 8887) Ehsan Amini, Somayyeh Jafarali Jassbi 2015 (Year: 2015).*

*Primary Examiner* — Alexandru Cirnu
(74) *Attorney, Agent, or Firm* — Eitan Mehulal Sadot

(57) ABSTRACT

System, device, and method for determining predicted annoyance level of multimedia content. A Predicted Annoyance Level (PAL) management unit processes content of frames of an endless-loop cinemagraph content-item, and determines a PAL score that indicates a predicted level of annoyance that the content-item is predicted to cause viewers due to motion of content in its content-item. The determining of the PAL score is based on comparison of content of pairs of frames of the endless-loop cinemagraph content-item; content of each frame of is compared to content of its immediately preceding frame, except for the first frame of the endless-loop cinemagraph content item which is compared to the last frame thereof. The PAL score is adjusted based on time-length and frame rate of the content item. Analysis of the PAL score triggers one or more notifications, alerts, or mitigation operations.

17 Claims, 2 Drawing Sheets

(56) References Cited

U.S. PATENT DOCUMENTS

| | | | |
|---|---|---|---|
| 2014/0259031 A1* | 9/2014 | Hsu | G11B 17/0282 |
| | | | 720/706 |
| 2015/0081397 A1* | 3/2015 | Hummel | G06Q 30/08 |
| | | | 705/7.37 |
| 2016/0314491 A1* | 10/2016 | Shani | G06Q 30/0275 |
| 2017/0295404 A1* | 10/2017 | Meredith | H04H 60/33 |

* cited by examiner

US 10,997,625 B1

SYSTEM, DEVICE, AND METHOD FOR DETERMINING PREDICTED ANNOYANCE LEVEL OF MULTIMEDIA CONTENT

FIELD

The present invention relates to communication systems and electronic devices.

BACKGROUND

Electronic devices and computing devices are utilized on a daily basis by millions of users worldwide. For example, laptop computers, desktop computers, smartphone, tablets, and other electronic devices are utilized for browsing the Internet, consuming digital content, streaming audio and video, sending and receiving electronic mail (email) messages, engaging in Instant Messaging (IM) and video conferences, playing games, or the like.

Some activities that are performed via an electronic device, involve consumption of marketing content or advertising content. For example, a user may read a news article in an online magazine, and a banner advertisement may be displayed in proximity to the article text. In another example, a streaming video website may show a short video advertisement to a user prior to playback of a particular streaming video that the user requested to watch.

SUMMARY

Some embodiments provide systems, devices, and methods for determining predicted annoyance level of multimedia content. For example, a Predicted Annoyance Level (PAL) management unit processes content of frames of a content-item, such as an endless-loop cinemagraph or animated GIF content-item; and determines a PAL score that indicates a predicted level of annoyance that the content-item is predicted to cause viewers due to motion of content in its content-item. The determination of the PAL score is based on comparison of content of pairs of frames of the content-item; for example, content of each frame of is compared to content of its immediately preceding frame, except for the first frame of the content item which is compared to the last frame thereof. The PAL score may be adjusted based on time-length and frame rate of the content item. Analysis of PAL scores may trigger notifications, alerts, or other operations.

The present invention may provide other and/or additional advantages and/or benefits.

DETAILED DESCRIPTION OF SOME DEMONSTRATIVE EMBODIMENTS

Figure 1:
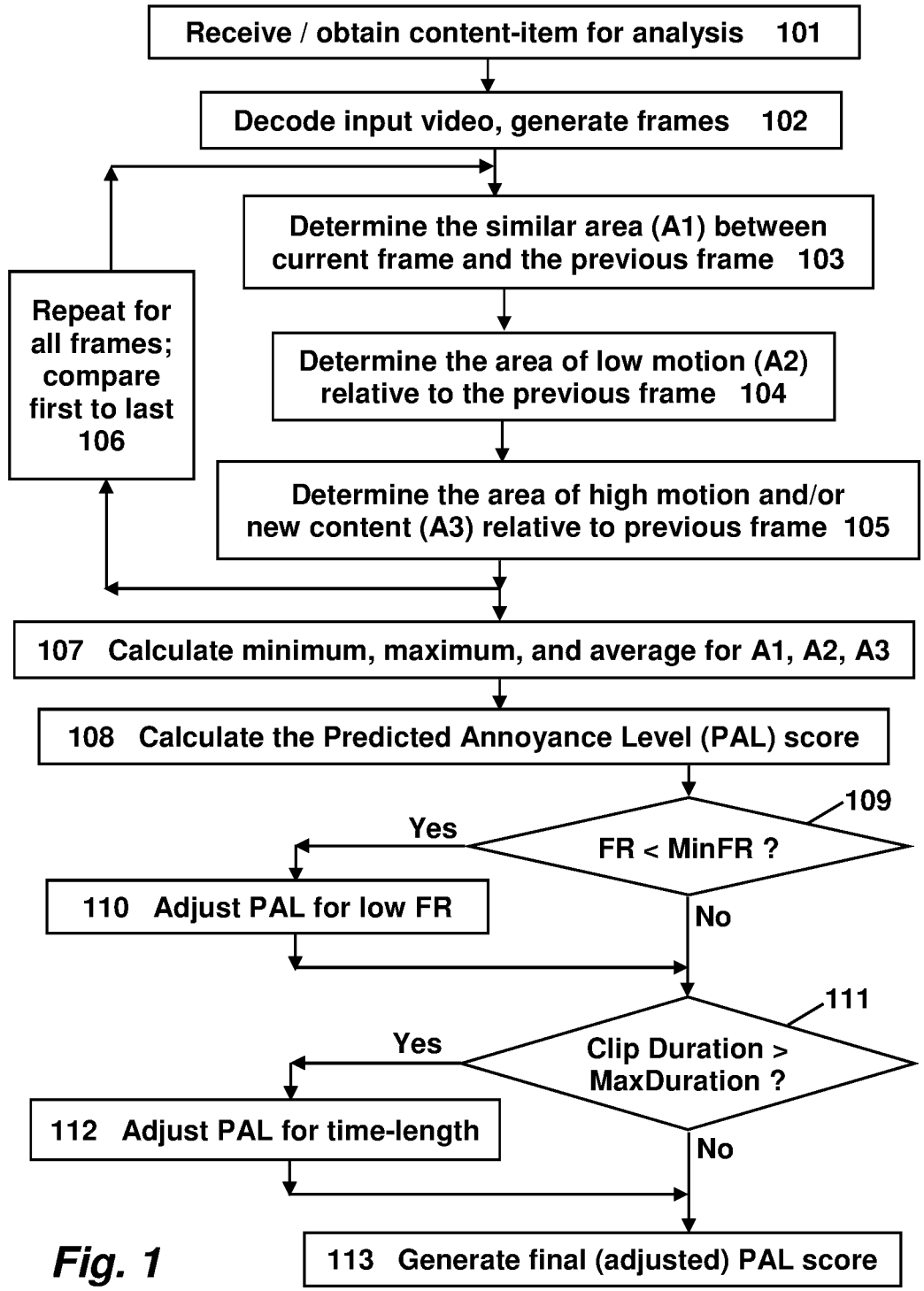
FIG. 1 is a flow-chart of a computerized method, in accordance with some embodiments of the present invention.

The terms "content" or "content-item" or "clip" as used herein may include, for example, a video, an audio-video, a video file, a video segment, a multimedia content that may include graphics and/or motion and/or video and/or sound and/or animation, a non-static multimedia item (e.g., having at least two frames that are at least partially different from each other), an advertisement or an ad, a file or a stream of bits or bytes that represents or that carry video content, a video-only or visual-only multimedia item that lacks audio or a silent video (e.g., represented as a GIF or an Animated GIF file or item), a video file or a streaming video that is encoded and/or compressed and/or represented using one or more suitable video codecs (e.g., AVC codec H.264, or HEVC codec or H.265, or the like) and/or stored or contained in a suitable container or file format (e.g., MP4, or MOV, or AVI, or MKV, or WebM, or a container for VP8 or VP9 or AV1 video, or the like), an animation or a dynamic presentation that is represented using bitmap graphics and/or vector graphics and/or textual elements and/or a program script (e.g., JavaScript, HTML5, CSS, or the like) that causes motion and/or animation or content modification, a dynamic or non-static content-item in which at least a portion of the content-item is modified or replaced (e.g., automatically, or autonomously; or at a particular time-point; or in response to user engagement such as hovering or clicking or tapping), a banner ad, a pre-roll or mid-roll or post-roll video or multimedia advertisement, a linear video or multimedia ad (e.g., that is displayed before or after or during a feature video), a non-linear or a concurrent video or multimedia ad (e.g., that is displayed concurrently while the feature video is played, such as in proximity to it or in another tab or another window or another on-screen area), a post-roll video or multimedia advertisement, a rich media content-item or ad, a companion ad that wraps around or is located adjacent to a feature movie or video, or the like.

For demonstrative purposes, some portions of the discussion herein may relate to a content-item that is utilized or served or played for marketing purposes or advertising purposes or promotional purposes; and may discuss some embodiments of the invention in the context of determining a Predicted Annoyance Level (PAL) score or PAL value for such type of content-item. However, some embodiments of the present invention are not necessarily limited to determining and/or utilizing PAL score(s) for advertising or marketing or promotional content-items, but rather, may operate on any suitable type or payload of content-item(s). For example, PAL values may be determined for a lengthy full-length video clip or movie or film or an episode of a television series, or of various other types of content-items that need not necessarily be short and/or advertising-related or marketing-related.

Embodiments of the present invention provide systems, devices, and method for determining or computing or calculating a Predicted Annoyance Level (PAL), or PAL score or PAL value or PAL indicator, with regard to a particular content-item that is being analyzed. Some embodiments may determine a PAL score for a "cinemagraph" or "cinemagraph" content-item, which is typically (but not necessarily) represented or encapsulated as an Animated GIF file (or as an MP4 file, or as a WEBM file, or the like), which is a content-item that typically includes an image or photo or drawing, in which one on more parts (e.g., typically a majority of the image) is still or static or non-moving or non-changing, whereas one or more other parts of that image (e.g., typically a minority of the image area) are moving or non-static or animated or self-modifying or changing. For example, a cinemagraph may include a photograph of a woman sitting in on a park bench, where most of the image is still and non-changing, but the hair of the woman appears to be subtly moving, typically in an endless loop. In another example, a cinemagraph may include a drawing of a street corner at night time, wherein a sign that says "Open" in a restaurant appears to be blinking on and off (e.g., every second) in an endless loop.

The present invention may operate to characterize and/or classify content-items, and particularly animated GIF files or animated WebP files, silent video files, non-silent video items, cinemagraph items, or the like, and to detect or determine that a particular content-item is estimated or predicted to have a high level of annoyance towards a user or towards a group of users, and/or to mark or tag or classify such content-item as an "annoying" or "excessively annoying" or "possibly annoying" content-item, or as a content-item having a great level of annoyance or a great potential to annoy audience(s).

The Applicants have realized that advertisers and marketing entities, which produce or author or prepare an advertising content-item, particularly for its inclusion in a webpage or web-site or a mobile application or "app", strive to capture the viewer's attention towards such advertisement and towards the product or service that it promotes; and such attempt to grab attention may often utilize eye-catching techniques that draw the user's attention and/or that engage or trigger the user to look at the advertisement and/or to click or tap on it.

The Applicants have also realized that for the purpose of capturing attention of viewer(s), images are typically more effective than plain text, and video clips or animated content or non-static content are typically more effective than still images. The Applicants have realized that the human vision system is (at least for some viewers) tuned to notice movement, even subtle movement or insignificant movement, and even movement of a small object located away from (or beyond) the center of the field-of-view (FOV) of the viewer; and therefore, even a relatively small or subtle movement or change or motion, in a small or partial area or in a portion of an image, may efficiently grab the user's attention as an eye-catching motion.

The Applicants have also realized that on the other hand, too much motion or excessive motion in an on-screen area, such as on the FOV peripheral area or in an area that is away from the center of the FOV of the user, tends to annoy the viewer, and may cause the user to abandon or leave the site completely, or to ignore the content-item, or to avoid further inspection of the content-item or engagement with the content-item.

The Applicants have realized that a cinemagraph, which is a set or series of images frames or a video, depicting subtle motion or subtle movement or subtle in-image changes (e.g., hair blows in the wind; light blinking on and off; water dripping intermittently) may be utilized as an efficient combination of sufficient motion for catching the attention of the viewer, yet do not reach an excessive amount of motion or movement that would cause the user to feel annoyed or harassed or uncomfortable.

Embodiments of the present invention may determine a score or indicator or value, for a content-item (e.g., media file, video file, sequence of images, GIF file, Animated GIF) for the level of annoyance that the content-item is estimated or predicted to have on viewers without, or indicating the level of "cinemagraph-ness" of such content-item (e.g., quantifying or predicting how effective the content-item is expected to be in catching the viewer's attention yet without causing to the viewer to feel annoyed or disturbed or harassed or burdened by the constant or intermittent motion or modification in the content-item). In some embodiments, a Predicted Annoyance Level (PAL) score may be generated for a content item, to indicate the predicted or estimated annoyance level thereof; for example, in some implementations, a higher PAL score may correspond to a greater probability that the content-item would annoy the viewer, and/or may correspond to certainty or to high-probability that the content-item would cause at least some annoyance to the viewer. In other implementations, a system may be configured such that a lower PAL score may correspond to a greater probability that the content-item would annoy the viewer, and/or may correspond to certainty or to high-probability that the content-item would cause at least some annoyance to the viewer. In other embodiments, other types of scores may be calculated, for example, a Cinemagraph Friendliness Score or a Subtle-Motion Score, in which a lower value indicates that the content-item (e.g., a cinemagraph or a video) is considered to be user-friendly and generally non-annoying, and/or includes non-excessive amount of motion or modification that do not cause annoyance or resentment or distraction to the viewer.

In some embodiments, systems for content authoring, content generation, content serving, content storing, content delivery, content publishing, or other content creating and/or handling and/or transmitting, may utilize the PAL generation methods of the present invention in order to generate PAL scores for content items, and to automatically select the appropriate content-items or media to be displayed out of multiple options or versions that are available, and/or to automatically exclude or discard or delete or not serve a particular version of the content-item which has a low PAL score (e.g., a PAL score that is smaller than a pre-defined threshold value).

In some embodiments, for example, an advertisement for a particular gadget may be stored at, or may be provided to, a content delivery network or a content repository, with two or more versions having different resolutions and/or frame-rate and/or color depth and/or other attributes. The system may generate a PAL score for each version of the content-item; and may determine to utilize, or to serve or to transmit, only the version(s) whose PAL score is below a pre-defined threshold value.

In some embodiments, the entity that authored or composed or generated or created or uploaded a content-item that has a PAL score that is smaller than a pre-defined threshold value, may receive an automatic notification from the system, indicating that the content-item has a low PAL score (e.g., lower than a pre-defined threshold value), and recommending to that entity to modify or replace or fix the content-item or to provide a different content-item having a higher PAL score.

In some embodiments, the system may comprise a content modification unit, which may be able to automatically process a content-item having a PAL score smaller than a pre-defined threshold; and able to automatically generate from it a modified content-item having a PAL score that is smaller than or equal to that pre-defined threshold; for example, by changing one or more attributes and/or colors of the content-item, and/or by dropping or discarding frames from it, and/or by duplicating frames in it, and/or by changing a speed at which frames are displayed, or the like.

In some embodiments, the system that generates the PAL score for a content-item, or other devices or system, may then determine whether or how to utilize that content-item by taking into account also the level of service that is associated with other content that is intended to be displayed concurrently with the content-item or in proximity to it. In an example, the system may determine that a particular content item has a PAL score of 5; and the system may operate based on pre-defined rules, indicating that Premium Users (e.g., paying users, paying subscribers) of the website would not be served content-items having a PAL score that are smaller than 20, whereas free users (who do not pay for accessing that website) may be served content-items having any PAL score value, or having a PAL score that is smaller than 90. Similarly, the system may enforce rules such that a high-profile page or website portion, or paid content or premium content, would only be accompanied by content-items (e.g., advertisements) having a low PAL score or a low estimated level of annoyance.

In some embodiments, the system may generate a PAL score for a content-item, based on (or, by taking into account) at the following criteria or parameters: (a) the calculated percentage of similar area between consecutive frames of the content-item; (b) the amount of (or the number of) new objects that are introduced between consecutive frames of the content-item; (c) the level of object motion between consecutive frames of the content-item; (d) the smoothness level of the playing loop, or a quantification of the level of similarity between the first frame and the last frame of the content item.

Reference is made to FIG. 1, which is a flow-chart of a computerized method, in accordance with some embodiments of the present invention. The method may be performed, for example, by a computer server, by a computer, by a content delivery network, by a content repository, by a content hosting system, by a content serving system, by a system that receives and/or processes and/or stores and/or transmits content, or the like. In some embodiments, the method may be performed in a stand-alone computer or electronic device; for example, implemented as a stand-alone software or application, or as a built-in or an integrated feature or functionality of an image creation software or in a video editing software or an animation creation software or in a cinemagraph creation/editing software, or as a plug-in or an extension or add-on or expansion pack for such software, or as part of a cloud-based functionality (e.g., as part of a cloud-based or in-the-browser video editing tool or animation creating tool or cinemagraph creating tool), or as part of a unit that performs conversion and/or transformation and/or transcoding and/or encoding of content (e.g., as part of an MP4 to Animated-GIF converter), or the like.

In some embodiments, a content-item is received or obtained for analysis (block 101). The content-item may be or may comprise, for example, a video file, a GIF file, an Animated GIF file, an MP4 file, an MKV file or a Matroska file, a MOV file, an AVI file, an AV1 file, a MOV file, a WebM file, a WebP file, an ASF file, a container for VP8 or VP9 or AV1 video, a container or file storing images or frames using lossy compression and/or encoding, a container or file storing images or frames using lossless compression and/or encoding, a set or series or batch of discrete frames or images, or the like. In some embodiments, the content-item is silent, or lacks any audio stream. In other embodiments, optionally, the content-item includes one or more audio streams or audio tracks, and the system of the present invention performs analysis that is based on the video stream and not on the audio stream(s). The content-item may be received from a provider of content-items or from a publisher or advertiser, from a marketing firm, from a content generator unit or a content generator entity, from a remote sender, for a local or a co-located source or repository of content-items, from a content delivery network (CDN) or from a node or network element thereof, from a content hosting server, from a content encoder unit, from a source (human or automatic) that uploads content-items (e.g., manually or automatically), or the like; or, the content-item may be automatically obtained or downloaded or fetched, from a local or remote storage or from a cloud-based repository, by the entity that performs the computerized method.

The method proceeds, optionally, by decoding the video of the content-item and generating from the content-item a series of discrete frames (block 102). In some embodiments, this step may be optional as the content-item may already be provided as a set of frames or as a set of discrete images (e.g., a Motion-JPEG or M-JPEG file). In other embodiments, a video stream is extracted from the content-item (if needed), and a set or batch or group of discrete frames are created in an order that matches their original order of appearance in the content-item. For example, an original content-item having five seconds of animation in a loop, at 30 frames-per-second (FPS), may be decoded and converted into a set of 150 discrete frames (or images), which may be assigned serial numbers (e.g., Frame 1 through Frame 150).

In some embodiments, for each frame, the method generates or determines three particular indicators (blocks 103, 104, 105); and as indicated in block 106, this is repeated for all the frames of the content-item. For example, if the content-item has 150 frames, the operations of blocks 103-105 are performed with regard to Frame 1 (comparing it to Frame 150 since the content-item is intended to play in a loop), then with regard to Frame 2 (comparing it to Frame 1), then with regard to Frame 3 (comparing it to Frame 2), and so forth until Frame 150 (comparing it to Frame 149).

In other embodiments, the method need not necessarily decode all the frames, or need not necessarily decode the entire sequence of frames, prior to starting the testing for annoyance or the comparison operations; for example, the method may decode and compare frames gradually or on-the-fly, starting by decoding only two frames (e.g., frames 1 and 2), then performing the comparison between those two frames (frames 1 and 2), then proceeding to decode the next frame (e.g., frame 3), then performing the comparison between frames 2 and 3, and so forth; as this may allow, in some implementations, to speed-up the process and/or to avoid an unnecessary delay and/or to avoid utilization of large memory blocks (e.g., in order to decode an entire sequence of numerous frames and to store decoded raw frames in memory).

In still other embodiments, the method may operate by decoding and buffering (or temporarily storing in memory) N frames at a time, such as, 2 frames at a time, or 3 frames at a time, or 4 frames at a time, and may perform comparison operations on pairs of frames that were already decoded.

In yet other embodiments, one or more processing threads and/or processing cores and/or processing resources may be dedicated or allocated or utilized for the purpose of decoding frames, whereas one or more other processing threads and/or processing cores and/or processing resources may be dedicated or allocated or utilized for the purposes of comparing pairs of frames; although in other embodiments, a single processing unit or a single set of processing resources may be utilized to perform both the decoding operations and the comparison operations.

In some embodiments, optionally, a frame that was used already for two comparisons is discarded or removed from memory, thereby allowing a computerized system to use a smaller memory space; for example, after the comparison of Frame 5 with Frame 6, and after the comparison of Frame 6 with Frame 7, the decoded Frame 6 may be discarded or removed from memory as it is no longer needed for further comparison purposes.

In some implementations, optionally, the decoded Frame 1 may be maintained or kept in memory and not-discarded after it is compared with the decoded Frame 2, as the decoded Frame 1 would be needed for comparison with the last frame. In some embodiments, a memory space or a buffer may store no more than three decoded frames at any given time, and/or may suffice to have a capacity for storing not more than three decoded frames; for example, storing firstly Frames 1 and 2, then comparison is made between Frame 1 and 2, then storing Frames 1 and 2 and 3, then comparison is made between Frame 2 and 3, then Frame 2 can be discarded and the buffer would now store Frames 1 and 3 and 4, then comparison is made between Frames 3 and 4, then Frame 3 can be discarded and the buffer would now store Frames 1 and 5, and so forth until reaching the last frame, to be compared against Frame 1 of the sequence; thereby enabling a memory-efficient implementation that needs to store only three decoded frames even if a sequence of hundreds of frames is being analyzed for its annoyance level.

Other suitable implementations may be used, and/or other suitable order of operations may be used, in addition to or instead of the above-mentioned non-limiting examples.

For demonstrative purposes, portions of the discussion above or herein may relate to comparison of a frame with its immediate neighbor frame, such as, with its immediately consecutive frame (e.g., comparing Frame 6 to Frame 7) or with its immediately previous frame (e.g., comparing Frame 6 to Frame 5). However, these are non-limiting examples; and some embodiments may utilize comparisons of other types of pairs of decoded frames; for example, comparing frame K with frame K+2, and/or comparing frame K with frame K−2; other suitable frame pairing methods may be used, instead of (or in addition to) the comparison of the pair of frames K and K+1.

As indicate in block 301, the method calculates or determines (for each frame) the area (denoted A1) of the current frame that is identical (or, that is sufficiently similar, beyond a pre-defined threshold level of similarity) to content shown in the immediately-previous frame or to a corresponding region of the immediately-previous frame. For example, a content-item of 300×200 pixels (total area of 6,000 pixels) depicts a generally-static image of a garden, in which a branch of leaves in the corner of the image depicts leaves that are subtly moving in the wind; Frame 5 and Frame 4 share the same content of static, non-moving, content which occupies 5,300 pixels of the image, and thus the area A1 is 5,300 pixels; whereas the moving leaves (the non-similar area when comparing Frame 5 to Frame 4) is 700 pixels. This determination may utilize one or more algorithms that measure differences between two images; for example, a Sum of Absolute Differences (SAD) algorithm, or a Mean Squared Error (MSE) or a Means Squared Deviation (MSD) algorithm, in conjunction with one or more pre-defined threshold values for similarity. As indicated above (and in block 106), each frame of the N frames is analyzed (in block 103) relative to its immediately-previous frame; except for Frame 1 (the first frame) which is compared to Frame N (the last frame).

The method also calculates (block 104) for each frame the area (denoted A2) having low motion or relatively low motion (e.g., motion below a pre-defined threshold value) when compared to the previous frame. This may be performed by a motion estimation (ME) algorithm, which calculates the motion vector MV) of each frame segment or frame region, and by taking into account pre-defined threshold values to determine which segments pass the criteria for low or sufficiently-low or relatively-low level of motion. As indicated above (and in block 106), each frame of the N frames is analyzed (in block 104) relative to its immediately-previous frame; except for Frame 1 (the first frame) which is compared to Frame N (the last frame).

The method further calculates (block 105) for each frame the area (denoted A3) having completely new content (namely, content that was not included in the immediately-previous frame). In some embodiments, such "new content" may further comprise a content-portion that has moved by at least at pre-defined threshold value (e.g., by at least P pixels, or by at least L percent of the frame length, or by at least W percent of the frame width) relative to the location of that content-portion in the previous frame. In some embodiments, the area A3 may be equivalent to the all the area of the frame that is not included in A1 (identical or sufficiently-similar area) and that is not included in A2 (low-motion area). As indicated above (and in block 106), each frame of the N frames is analyzed (in block 105) relative to its immediately-previous frame; except for Frame 1 (the first frame) which is compared to Frame N (the last frame).

As indicated in block 106, the above calculations of blocks 103-105 are performed for each one of the frames, Frame 1 through Frame N; and the first frame (Frame 1) is compared to the last frame (Frame N), since the content-item typically plays in an infinite loop or in a finite loop (e.g., 10 loops), and such calculation may indicate the level of smoothness of loop playback of the content-item, or may indicate whether there is an abrupt and a viewer-annoying change in the scene (when it loops from Frame N back to Frame 1) plays in a loop and an abrupt change in the scene may cause the viewer annoyance.

The method proceeds (block 107) to calculate the average value of A1 over all the frames of the content-item (denoted A1average), and to calculate the average value of A2 over all the frames of the content-item (denoted A2average), and to calculate the average value of A3 over all the frames of the content-item (denoted A3average). Similarly, the method may calculate the maximum value of A1 over all the frames of the content-item (denoted A1max), and to calculate the maximum value of A2 over all the frames of the content-item (denoted A2max), and to calculate the maximum value of A3 over all the frames of the content-item (denoted A3max). Similarly, the method may calculate the minimum value of A1 over all the frames of the content-item (denoted A1min), and to calculate the minimum value of A2 over all the frames of the content-item (denoted A2 min), and to calculate the minimum value of A3 over all the frames of the content-item (denoted A3 min). In some embodiments, other suitable parameters may be calculated, and may subsequently be utilized for PAL score determination; for example, a median value, a standard deviation value, a variance value, a range value, or the like.

Then, a combined or weighted Predicted Annoyance Level (PAL) score is calculated or determined for the content-item (block 108), based on some or all of the parameters that were determined for that content-item in block 107. The specific weighted formula or algorithm that is applied on the calculated parameter, may be determined, for example, by running candidate formulas and then comparing their resulting score to manually-determined scores for content-items in a set or dataset or database of content-images that were shown to a focus group or to an experiment group of human viewers. For example, a focus group of 100 or 500 human users (e.g., each one separately on his own electronic device) may be shown various content-items, one at a time, and may be requested to rate its actual level of annoyance on a scale of 0 to 10 (or other suitable scale); the Actual Annoyance Level (AAL) scores that were provided manually by such human users, may then be averaged across all users for each content-item, to generate an average or combined AAL score as learned from this focus group; and the AAL of a set of content-items may be used as Reference Scores for testing the threshold values and/or the weighted formula(s) that utilize AverageA1 and AverageA2 and AverageA3 in order to reach similar or sufficiently-similar PAL scores.

The PAL score that is calculated in block 108 for the content-item, may be regarded as a non-adjusted PAL score or as an unadjusted PAL score; since it is based on the averages of certain areas, and does not take into account other meta-data or attributes of the content-item, such as its frame rate (FR), its duration or its length (in frames, or in seconds), or other attributes. In some embodiments, optionally, one or more such attributes may further be utilized by the system, in order to take the non-adjusted PAL score and generate from it an Adjusted PAL score, that takes into account one or more such additional attributes of the content-item.

For example, as indicated in blocks 109-110, some embodiments may adjust or modify the PAL score by taking into account the frame rate (FR) of the content-item. The Applicants have realized that a relatively low frame rate (e.g., smaller than a pre-defined threshold value; such as, smaller than 7 frames-per-second) may be associated with a greater level of annoyance, due to user-annoying "jumps" or non-smooth transitions between frames. Accordingly, the method may check (block 109) whether the frame rate of the content-item is smaller than a pre-defined threshold value; and if so, then the PAL score may be adjusted or modified (block 110), for example, by multiplying the PAL score by a pre-defined factor or coefficient (e.g., a coefficient that is in the range of 0 to 1 if a smaller PAL score corresponds to greater annoyance). In some embodiments, optionally, multiple such threshold values may be used, or a range or lookup table of threshold values may be used, or a plurality of different factors or coefficients may be used as a function of the actual frame rate of the content-item. For example, some embodiments may determine that a frame rate that is under 8 FPS may require to multiply the unadjusted PAL score by a factor of 0.8, whereas a frame rate that is in the range of 8 to 23 FPS may require to multiply by a factor of 0.9, whereas a frame rate greater than 23 FPS may require to multiply by a factor of 1 (no adjustment for frame rate). Other suitable rules or threshold values or ranges may be used.

Similarly, as indicated in blocks 111-112, some embodiments may adjust or may further adjust the PAL score based on the time-length duration of the content-item (e.g., without playback looping). The Applicants have realized that in some implementations, content-items that are lengthier than a pre-defined length threshold value (e.g., 45 seconds, or 60 seconds), are typically regarded as less-annoying by viewers, and/or are typically not utilized for explicitly drawing attention of the viewer but rather are utilized for displaying content after the user has already switched his attention to the content-item. Accordingly, the method may check (block 111) whether the time-length duration of the content-item is greater than a pre-defined threshold value; and if so, then the PAL score may be adjusted or modified (block 112), for example, by multiplying the PAL score by a pre-defined factor or coefficient (e.g., a coefficient that is in the range of 0 and 1 if a smaller PAL score corresponds to greater annoyance). In some embodiments, optionally, multiple such threshold values may be used, or a range or lookup table of threshold values may be used, or a plurality of different factors or coefficients may be used as a function of the actual time duration of the content-item. For example, some embodiments may determine that a content-item duration that is under 9 seconds may require to multiply the PAL score by a factor of 0.75, whereas a content-item duration that that is in the range of 9 to 36 seconds may require to multiply by a factor of 0.86, whereas a content-item duration greater than 36 seconds may require to multiply by a factor of 1 (no adjustment for content-item duration). Other suitable rules or threshold values or ranges may be used.

The method may similarly perform other, optional, adjustment(s) of the PAL score, and may generated the final (adjusted) PAL score (block 113). For example, a record in a repository that stores the particular content-item, may be updated to store the final PAL score for that content-item, e.g., in a field of this record, or in a data-item that is linked to that record or to that content-item.

Other operations may be performed by embodiments of the present invention. For example, generation of a PAL score that indicates excessive annoyance to the viewer (e.g., a PAL score that is smaller than a pre-defined value, in an implementation that utilizes greater PAL score values to indicate more annoyance), may trigger immediate or subsequent action(s) that may be performed automatically or autonomously by a computerized system. Such operations may include, for example: generating and/or sending a notification or a warning or an alert message, to an entity that uploaded or sent or transmitted or created the content-item; moving the content-item into a quarantine area, or associating the content-item with a "do not use" flag or indicator; or in some implementations, even automatic discarding or deleting or removal of the content-item; or, in some advertising system, replacement of the particular content-item with another content-item that was submitted by the same publisher or entity; or the like.

Referring now again to block 108, a variety of formulas or calculations may be utilized to generate the initial or unadjusted PAL score, based on the three average values (AverageA1 and AverageA2 and AverageA3). As a non-limiting example, some embodiments may utilize formulas that generate a PAL score in a particular range (e.g., 0 to 100, or other range), such that a lower score indicates a more-annoying content-item or an annoyingly-distracting content-item or an attention-disrupting content item, whereas a higher score indicates an appealing or non-annoying content-item.

For example, a Remap function may be defined, for linearly mapping multiple input values to a single output value. As a non-limiting example, the Remap function may be:

Remap$(x,A,B,C,D)=$

If x>B then return D
If x<A then return C

Else return $C+[(D-C)(x-A)/(B-A)]$

In a demonstrative implementation, the following rules may be used:

Let Avg_S=A1average, which is the average frame area with identical or similar content.
Let RMAvg_S=Remap (Avg_S, 0.02, 0.42, 0, 1).
Let Min_S=A1min, which is the minimum of the frame area with identical or similar content.
Let RMMin_S=Remap (Min_S, 0, 0.15, 0, 1).

Let Avg_N=A3average, which is the average frame area with new content.

Let RMAvg_N=Remap (Avg_N, 0.04, 0.3, 1, 0).

Let Max_N=A3max, which is the maximum frame area having new content.

Let RMMax__N=Remap (Max_N, 0.2, 0.55, 1, 0).

In some embodiments, the non-adjusted PAL score may be calculated as:

$$PAL=[W\_N*Min(RMAvg\_N,RMMax\_N)]+\\ [W\_S*Min(RMMin\_S,RMAvg\_S)]$$

The values of W_N and W_S may be pre-defined values, which may be configured or determined via an experiment which compares automatically-generated PAL scores to manually-provided annoyance scores of content items as provided by a focus group of users. In some implementations, for example, W_N may be 0.61 or 0.62 or 0.65 or 0.69 or 0.74 or 0.90, or other suitable values. In some implementations, W_S may be 0.26 or 0.38 or 0.48 or 0.57 or other suitable values. In some embodiments, particular pairs of parameters may be used; for example, W_N=0.59 and W_S=0.41; or in some implementations, W_N=0.62 and W_S=0.38; or in some implementations, W_N=0.72 and W_S=0.28; or in some implementations, W_N and W_S may be selected or configured such that each one of them in the range of 0 to 1 and such that their sum is exactly 1; other suitable values may be used.

Figure 2:
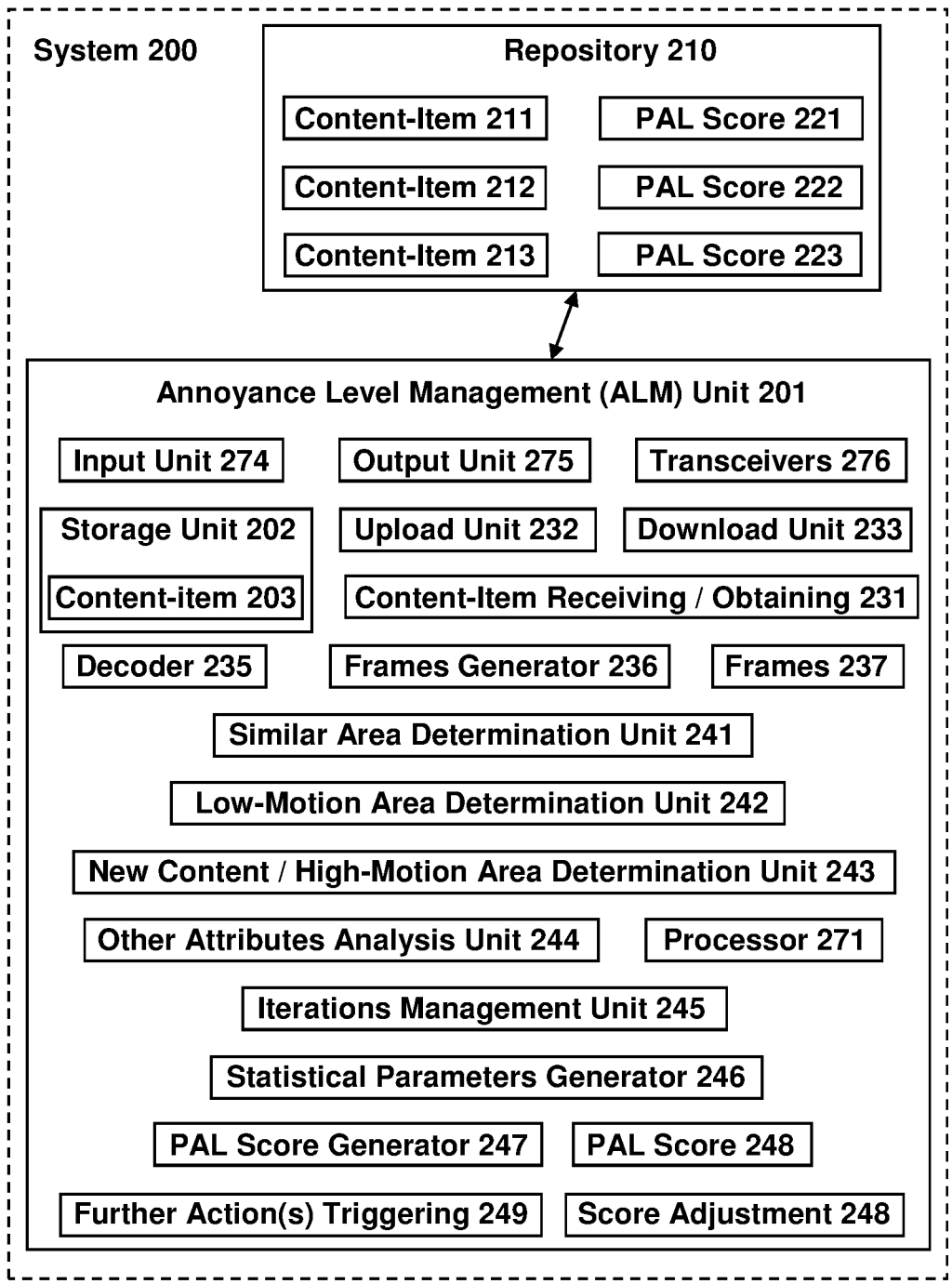
FIG. 2 is a block-diagram illustration of a system, in accordance with some demonstrative embodiments of the present invention.

Reference is made to FIG. 2, which is a block-diagram illustration of a system 200, in accordance with some demonstrative embodiments of the present invention. System 200 may be implemented by one or more hardware components and/or software component; by using a single device or multiple units, which may be co-located or remote to each other; by using client-server architecture or distributed architecture or peer-to-peer architecture; by using wired and/or wireless communication links; and/or by using other suitable topologies or architectures.

System 200 may comprise an Annoyance Level Management (ALM) Unit 201, which may analyze content-items, may determine or generate or calculate their respective PAL scores, and may trigger or may perform one or more operations based on the determined PAL scores.

A storage unit 202 may store a content-item 203 for which the PAL score is to be generated. For example, a Content-Item Receiving/Obtaining Unit 231 may perform the operations of block 101, by receiving or obtaining a particular content-item for PAL score determination. For example, an Upload Unit 232 may enable a user or a third-party (e.g., a developer, a content creator) to upload or send a content-item to the ALM Unit 201 for PAL score generation. Additionally or alternatively, a Download Unit 233 may be configured to cause the ALM unit 201 to automatically fetch or obtain or copy or download a content-item, from a remote repository or from a local repository of content-items, for PAL score generation. In some embodiments, a Repository 210 may store a plurality of content-items, such as content items 211-213; and may later store the respective PAL scores 221-223 that the ALM unit generates for them, as the ALM unit 201 processes each one of the content-items (211, 212, 213) to generate its respective PAL score (221, 222, 223). In some embodiments, Repository 210 may be co-located near or in proximity to the ALM Unit 201; or may be an internal or integral or integrated part of the ALM unit 201; or may be accessible by the ALM unit 201 via one or more wired communication links and/or wireless communication links and/or over the Internet and/or as part of a cloud-based computing and storage platform.

A Decoder Unit 235 may perform video decoding of the particular content-item 211 being analyzed; and a Frames Generator 236 may generate a set or series of discrete (separate) frames 237 from the decoded video or directly from the content-item, and such frames may be stored in a memory unit or storage unit of system 200 for further processing as described.

A Similar Area Determination Unit 241 may perform the operations of block 103. A Low-Motion Area Determination Unit 242 may perform the operations of block 104. A New Content/High-Motion Area Determination Unit 243 may perform the operations of block 105. Optionally, an Other Attributes Analysis Unit 244 may process each frame to determine other, optional, parameter that may be later used; for example, the number of colors used in the frame, a difference in contrast or in brightness or in color levels or in saturation between the current frame and the previous frame, or the like; as some implementations may optionally utilize such or other additional attributes for PAL score generation. An Iterations Management Unit 245 may be responsible for the operations of block 106, ensuring that the calculations are performed for each frame, from Frame 1 to Frame N; and that each frame is compared or analyzed relative to the frame immediately before it, except for Frame 1 which is compared or analyzed relative to Frame N. The Iterations Management Unit 245 may further be responsible for storing the calculated values in memory or in storage, for subsequent utilization.

A Statistical Parameters Generator 246 may then operate on the set of values calculated for each frame of the particular content-item, to generate the Average, the Maximum, the Minimum, and/or other statistical parameters per content-item, based on the discrete values that were computed for each frame of that content-item. Then, a PAL Score Generator 247 may then utilize the statistical parameter that were generated for the content-item, and may optionally utilize data calculated for specific frames thereof, in order to generate a PAL Score 248 for that particular content-item. Optionally, an Score Adjustment Unit 248 may adjust or modify the initial PAL score 248 into a final or adjusted PAL score, by applying score-correction rules or score-modification rules that are based on, for example, the frame-rate of the content-item, the time duration of the content-item (un-looped), the number of colors in the content item, or the like. It is noted that in some embodiments, the adjustment or modification operations for a PAL score, need not necessarily be separate from the PAL score generation; but rather, in some implementations, such rules or criteria or conditions for adjusting or modifying the PAL score may be integral or internal to the PAL score generation algorithm and/or to the PAL Score Generator 247. The final (or adjusted, or modified) PAL score of the content-item, may then be written or updated into the Repository, and/or may be reported to a third-party or may be logged or otherwise stored or transmitted.

For demonstrative purposes, some portions of the discussion above or herein may relate to generating a PAL score for an entirety of a content item, and particularly based on analyzing or comparing decoded frames of the entirety of the content item or a majority of the frames of the content item or a pre-defined percentage of the frames of the content item; however, some implementations need not necessarily analyze the entire sequence of frames in a particular content item in order to determine that this content item should be associated with a low PAL score or with an indication or a tag that it would cause annoyance to most viewers. For example, a video sequence of 20 seconds, at 30 frames-persecond, may span 600 frames; an analysis may be performed with regard to the annoyance level of the first five seconds (based on the first 150 frames), and such analysis of the video-segment may already lead to a determination that this video-segment is estimated to cause a high level of annoyance to viewers (e.g., the analyzed video-segment has a low PAL score); and therefore, in some implementations, optionally, the system may cease the analysis and may avoid analysis of other segment(s) of that video, and may update in the repository that this video has a low PAL score, since a 20-seconds video that begins with 5 seconds of annoying video content is considered (in some implementations) as an annoying video even if the next 15 seconds of the video may have little or no motion or may cause little or no annoyance.

In some embodiments, optionally, the system may be configured such that an entire content item is tagged or marked as having a high annoyance level, if at least the first K seconds of that content item (e.g., the first 10 seconds thereof) are found to have a high annoyance level (e.g., a PAL score that is smaller than a pre-defined threshold value), even if other portions of that content item actually have, by themselves, low annoyance levels (e.g., high PAL score values); and in some implementations, even if a PAL score generation for the entirety of the content item may lead to a greater overall PAL score; since, for example, some systems may be configured based on a pre-definition that a content item that has, e.g., 30 seconds of video, would be marked or tagged as Annoying or as Highly Annoying if the first 10 seconds of that video are found to be (by themselves) Annoying or Highly Annoying (e.g., having a PAL score that is smaller than a pre-defined threshold value).

In some embodiments, optionally, the system may be configured such that an entire content item is tagged or marked as having a high annoyance level, if at least any K (consecutive, or even non-consecutive) seconds of that content item (e.g., any 8 seconds portion within that content item) are found to have a high annoyance level (e.g., having a PAL score that is smaller than a pre-defined threshold value), even if other portions of that content item actually have, by themselves, low annoyance levels; and in some implementations, even if PAL score generation for the entirety of the content item may lead to a higher overall PAL score; since, for example, some systems may be configured based on a pre-definition that a content item that has, e.g., 45 seconds of video, would be marked or tagged as Annoying or as Highly Annoying if any 8-second portion of that video are found to be (by themselves) Annoying or Highly Annoying (e.g., having a PAL score that is smaller than a pre-defined threshold value.

In some embodiments, long-duration content items (e.g., longer than a pre-defined threshold value; such as, longer than 30 or 60 seconds) may be handled in two stages. In a first stage, only the first K seconds of the content item are analyzed, and a PAL score is generated for those K seconds by themselves (e.g., for the first 10 seconds). The PAL score that was generated for those first K seconds, may rapidly be written into the repository as currently being indicative of the content item's annoyance level, even though only K seconds of it were analyzed. Then, in a second stage, the system may proceed to calculate the overall PAL score for the entirety of the content item, which may then be written into the repository, overriding or over-writing the interim PAL score that was calculated based on the first K seconds. This may allow some systems to rapidly tag or mark some content items as Annoying, based on rapid partial analysis; and to continue with the analysis of the overall content item while the content item is already temporarily tagged or marked in the repository as an Annoying content item which is, for example, temporarily quarantined or temporarily being prevented from serving to viewers until the final PAL score is generated based on analysis of the entirety of the content item.

In some embodiments, optionally, such long-duration content item may be analyzed gradually, such that upon analysis of every additional K seconds of the content item, its PAL score is updated in the repository; and such that, for example, a content item of 40 seconds would have a first interim PAL score generated upon analysis of its first 10 seconds, then a second interim PAL score would be generated and override the previous score upon analysis of its first 20 seconds, then a third interim PAL score would be generated and override the previous score upon analysis of its first 30 seconds, and then a fourth and final PAL score would be generated and override the previous score upon analysis of the entire 40 seconds.

In some embodiments, optionally, and particularly with regard to long-duration content items (e.g., a content item that has a duration longer than a pre-defined threshold value; such as, longer than 60 seconds), a single content item may be divided into multiple segments, and a separate PAL score may be generated separately for each segment; for example, a 60-second video may correspond to six consecutive 10-second video segments, each one of them having its own PAL score; and the six different PAL scores may be stored in the repository in relation to that content item, instead of (or in addition to) the overall PAL score of the entirety of the 60-second video. This may allow the system, for example, to provide high-quality feedback to content publishers or advertisers or content creators or developers, having a finer level of granularity; such that, for example, instead of generating an alert message to the content publisher that "Your 60-second advertisement was rejected for having highly annoying content", the system may be able to generate a more fine-tuned or higher-granularity alert message such as "Your 60-second advertisement was rejected because the last 10 seconds thereof contain highly annoying content", thereby allowing the relevant entities to pin-point the problematic portion of the content item for curing or replacement.

Optionally, a Further Action(s) Triggering Unit 249 may operate to check whether the generated PAL score is smaller than) a pre-defined threshold value, or is within a particular range of values, or is not within a particular range of values; and in such situation, may cause or trigger (or may directly execute or invoke) one or more pre-defined operations; for example, generating or sending an alert message or a notification, discarding or deleting the content-item, replacing the content-item with another content-item of the same publisher or the same source or based on replacement rules (e.g., replacing a content-item of a top bidder in a Real-Time Bidding auction for advertisements, with a content-item of a next-in-line bidder), or the like.

System 200 may optionally be implemented as, or may comprise, or may be associated with, other types of components or devices. For example, in some embodiments, system 200 may be, or may comprise, or may be part of, a computerized content-creation platform or content-generation platform, which allows developers or graphic designers or other users to generate or create or compose videos or animated GIF files or animation; and the system may be configured to check, automatically and/or upon request of the user, the PAL score for a content-item that is being created or that has just been created; and to report to the user of the platform what is the estimated or predicted level of user-annoyance that the content-item would cause to viewers. In another implementation, system 200 may be a cloud-based service or platform, or may be part of a "Software as a Service" (SaaS) platform, which allows a user to upload or to otherwise provide a single content-item or a batch or group of content-items for automatic analysis and reporting of their respective PAL scores by the platform; such as, prior to sending such content-items to a publisher or to a client or to an online advertising platform or to a content delivery network (CDN), or the like. In another implementation, system 200 may be an integral or integrated part of, or may be associated with, a CDN or a content serving platform, or a cloud-based storage platform or service, or an advertising marketplace or platform, such that system 200 may automatically and/or autonomously generate a PAL score for any content-item provided to it or obtained by it, or to particular types of content-items (e.g., only to Animated GIFs; or, only to content-items having a minimum on-screen area size); and system 200 may trigger one or more suitable operations or notifications upon determining that particular content-item(s) have PAL scores that are not within an appropriate pre-defined range of values. In some embodiments, a content-item that is determined to have a PAL score that is outside a pre-defined range of acceptable PAL score values, may be deleted or discarded or may be flagged as suspended or non-used, or may be removed from utilization by a Content Delivery Network (CDN) or from an online advertising platform or marketplace, or may be blocked from being served to end-users, or may be replaced (automatically or manually) with a replacement content-item based on pre-defined rules (e.g., by automatically selecting another content-item from a batch of content-items of the same publisher or entity that provided the original content-item, such that the replacement content-item has a PAL score within the acceptable range of values). In some embodiments, optionally, an automatic crawler or crawling unit or file scanner may automatically scan or process many, or all, of the content items that are stored on a repository of a file-serving or file-hosting platform or of a CDN, and may discard or delete or flag content-items that are found to have a PAL score that is not within an acceptable pre-defined range of values; and may generate or send alert notification(s) to the parties or entities that published or provided or uploaded such content items; or may temporarily suspend utilization or serving or delivery of such content-items in a CDN or in an online advertising platform or in an online advertising marketplace. Other suitable operations or implementations may be used.

In some embodiments, in order to perform the computerized operations of system 200, such system may be equipped with relevant hardware components and/or software components, for example: a processor 271 able to process data and/or execute code or machine-readable instructions (e.g., a central processing unit (CPU), a graphic processing unit (GPU), a digital signal processor (DSP), a processing core, an Integrated Circuit (IC), an Application-Specific IC (ASIC), one or more controllers, a logic unit, or the like); a memory unit 272 able to store data for short term (e.g., Random Access Memory (RAM), volatile memory); storage unit 203 able to store data for long term (e.g., non-volatile memory, Flash memory, hard disk drive, solid state drive, optical drive); an input unit 274 able to receive user's input (e.g., keyboard, keypad, mouse, touch-pad, touch-screen, trackball, microphone); an output unit 275 able to generate or produce or provide output (e.g., screen, touch-screen, monitor, display unit, audio speakers); one or more transceivers 276 or transmitters or receivers or communication units (e.g., Wi-Fi transceiver, cellular transceiver, Bluetooth transceiver, wireless communication transceiver, wired transceiver, Network Interface Card (NIC), modem); and other suitable components (e.g., a power source, an Operating System (OS), drivers, one or more applications or "apps" or software modules, or the like).

In accordance with embodiments of the present invention, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Although portions of the discussion herein relate, for demonstrative purposes, to wired links and/or wired communications, some embodiments are not limited in this regard, but rather, may utilize wired communication and/or wireless communication; may include one or more wired and/or wireless links; may utilize one or more components of wired communication and/or wireless communication; and/or may utilize one or more methods or protocols or standards of wireless communication.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C#, Java, JavaScript, SQL, Ruby on Rails, Go, Cobol, Fortran, ActionScript, AJAX, XML, JSON, Lisp, Eiffel, Verilog, Hardware Description Language (HDL, BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Furthermore, repeated use of the phrase "in one embodiment" does not necessarily refer to the same embodiment, although it may. Similarly, repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may be used in, or in conjunction with, various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a tablet, an on-board device, an off-board device, a hybrid device, a vehicular device, a non-vehicular device, a mobile or portable device, a consumer device, a non-mobile or non-portable device, an appliance, a wireless communication station, a wireless communication device, a wireless Access Point (AP), a wired or wireless router or gateway or switch or hub, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), or the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA or handheld device which incorporates wireless communication capabilities, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may comprise, or may be implemented by using, an "app" or application which may be downloaded or obtained from an "app store" or "applications store", for free or for a fee, or which may be pre-installed on a computing device or electronic device, or which may be otherwise transported to and/or installed on such computing device or electronic device.

In some embodiments, a method comprises: processing content of a plurality of frames of a content-item, and determining a Predicted Annoyance Level (PAL) score that indicates a predicted level of annoyance that said content-item is predicted to cause viewers due to motion of content in said content-item. In some embodiments, the determining of the PAL score is based on comparison of content of pairs of frames of said content-item, wherein content of each frame is compared to content of a preceding frame, except for the first frame of the content item which is compared to the last frame of the content item. In some embodiments, the determining of the PAL score is based at least on a determination of an area of each frame, which is identical or is sufficiently similar beyond a pre-defined threshold level of similarity, to a corresponding area of said preceding frame.

In some embodiments, the determining of the PAL score is further based at least on a determination of an area of each frame which comprises new content relative to said preceding frame. In some embodiments, the determining of the PAL score is further based at least on a determination of an area of each frame which comprises a content-portion that is located at an in-frame offset relative to an in-frame location of said content-portion in said preceding frame; wherein said in-frame offset is greater than a pre-defined threshold value. In some embodiments, the determining of the PAL score is further based at least on a determination of an area of each frame which comprises content having low motion relative to said preceding frame and based on a threshold value defining which in-frame motion is low motion.

In some embodiments, the determining of the PAL score is based at least on: an average value of non-changing portions of each frame relative to its immediately preceding frame. In some embodiments, the determining of the PAL score is based at least on: an average value of a modified portion of each frame relative to its immediately preceding frame.

In some embodiments, the determining of the PAL score further comprises: checking whether the content-item has a frame rate that is smaller than a pre-defined threshold value; if the checking result is positive, then: modifying the PAL score to indicate a greater predicted level of annoyance.

In some embodiments, the determining of the PAL score further comprises: if a frame rate of said content item has a first value, then applying to said PAL score a first modification computation; if the frame rate of said content item has a second, different, then applying to said PAL score a second, different, modification computation.

In some embodiments, the determining of the PAL score further comprises: checking whether the content-item has a non-looped time duration that is greater than a pre-defined threshold value; if the checking result is positive, then: modifying the PAL score to indicate a smaller predicted level of annoyance.

In some embodiments, the determining of the PAL score further comprises: if a non-looped time duration of said content item has a first value, then applying to said PAL score a first modification computation; if a non-looped time duration of said content item has a second value, then applying to said PAL score a first modification computation.

In some embodiments, the method comprises: if the PAL score of the content-item is smaller than a pre-defined threshold value, then: generating and transmitting a notification message, to an entity that provided said content-item, indicating that the content-item is predicted to have a high level of annoyance towards viewers.

In some embodiments, the method comprises: if the PAL score of the content-item is smaller than a pre-defined threshold value, then: suspending utilization of said content-item as an advertising content-item in an online advertising platform.

In some embodiments, the method comprises: if the PAL score of the content-item is smaller than a pre-defined threshold value, then: suspending utilization of said content-item as an advertising content-item in an online advertising platform; and selecting another content-item, having a greater PAL score, for utilization in said online advertising platform.

In some embodiments, the method comprises: performing said method in a stand-alone computerized application for creation of content-items as part of a process of creating or editing a content-item; if the PAL score of the content-item is smaller than a pre-defined threshold value, then: generating a notification message in said stand-alone computerized application for creation of content-items, indicating that the content-item is predicted to have a high level of annoyance towards viewers.

In some embodiments, the method comprises: performing said method in a cloud-based computerized application for creation of content-items as part of a process of creating or editing a content-item; if the PAL score of the content-item is smaller than a pre-defined threshold value, then: generating a notification message in said cloud-based computerized application for creation of content-items, indicating that the content-item is predicted to have a high level of annoyance towards viewers.

In some embodiments, the method comprises: automatically processing a batch of content-items that are stored in a repository of a Content Delivery Network (CDN) or of a cloud-based hosting service; wherein said processing comprises generating a PAL score for each of said content-items; automatically generating a report listing content-items having a PAL score that is within a pre-defined range of PAL score values.

In some embodiments, a system comprises: a Predicted Annoyance Level (PAL) management unit, to process content of a plurality of frames of an endless-loop cinemagraph content-item, and to determine a PAL score that indicates a predicted level of annoyance that said content-item is predicted to cause viewers due to motion of content in said content-item; wherein determination of the PAL score by the PAL management unit is based on comparison of content of pairs of frames of said endless-loop cinemagraph content-item; wherein content of each frame of said endless-loop cinemagraph is compared to content of its immediately preceding frame, except for the first frame of the endless-loop cinemagraph content item which is compared to the last frame of the endless-loop cinemagraph content item. In some embodiments, determination of the PAL score by the PAL management unit is based at least on: (I) a determination of an area of each frame, which is identical or is sufficiently similar beyond a pre-defined threshold level of similarity, to a corresponding area of said immediately preceding frame; and (II) a determination of an area of each frame which comprises new content relative to said immediately preceding frame.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may thus comprise any possible or suitable combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of some demonstrative embodiments of the present invention have been illustrated and described herein, various modifications, substitutions, changes, and equivalents may occur to those skilled in the art. Accordingly, the claims are intended to cover all such modifications, substitutions, changes, and equivalents.

What is claimed is:
1. A method comprising:
processing content of a plurality of frames of a content-item, and determining a Predicted Annoyance Level (PAL) score that indicates a predicted level of annoyance that said content-item is predicted to cause viewers due to motion of content in said content-item;
wherein determining the predicted level of annoyance of said content-item is based on:
(i) a calculated percentage of similar area of content between consecutive frames of the content-item; and
(ii) a number of new objects that are introduced between consecutive frames of the content-item; and
(iii) a level of object motion between consecutive frames of the content-item; and
(iv) a quantification of a level of similarity between the first frame of the content-item and the last frame of the content item.

2. The method of claim 1,
wherein the determining of the PAL score is based on comparison of content of pairs of frames of said content-item, wherein content of each frame is compared to content of a preceding frame, except for the first frame of the content item which is compared to the last frame of the content item.

3. The method of claim 2,
wherein the determining of the PAL score is based at least on a determination of an area of each frame, which is identical or is sufficiently similar beyond a pre-defined threshold level of similarity, to a corresponding area of said preceding frame.

4. The method of claim 3,
wherein the determining of the PAL score is further based at least on a determination of an area of each frame which comprises new content relative to said preceding frame.

5. The method of claim 1,
wherein the determining of the PAL score is further based at least on a determination of an area of each frame which comprises content having low motion relative to said preceding frame and based on a threshold value defining which in-frame motion is low motion.

6. The method of claim 1,
wherein the determining of the PAL score further comprises:
checking whether the content-item has a frame rate that is smaller than a pre-defined threshold value;
if the checking result is positive, then: modifying the PAL score to indicate a greater predicted level of annoyance.

7. The method of claim 1,
wherein the determining of the PAL score further comprises:
if a frame rate of said content item has a first value, then applying to said PAL score a first modification computation;
if the frame rate of said content item has a second, different value, then applying to said PAL score a second, different, modification computation.

8. The method of claim 1,
wherein the determining of the PAL score further comprises:
checking whether the content-item has a non-looped time duration that is greater than a pre-defined threshold value;
if the checking result is positive, then: modifying the PAL score to indicate a smaller predicted level of annoyance.

9. The method of claim 1,
wherein the determining of the PAL score further comprises:
if a non-looped time duration of said content item has a first value, then applying to said PAL score a first modification computation;
if a non-looped time duration of said content item has a second value, then applying to said PAL score a first modification computation.

10. The method of claim 1, further comprising:
if the PAL score of the content-item is smaller than a pre-defined threshold value, then: generating and transmitting a notification message, to an entity that provided said content-item, indicating that the content-item is predicted to have a high level of annoyance towards viewers.

11. The method of claim 1, further comprising:
if the PAL score of the content-item is smaller than a pre-defined threshold value, then: suspending utilization of said content-item as an advertising content-item in an online advertising platform.

12. The method of claim 1, further comprising:
if the PAL score of the content-item is smaller than a pre-defined threshold value, then: suspending utilization of said content-item as an advertising content-item in an online advertising platform; and selecting another content-item, having a greater PAL score, for utilization in said online advertising platform.

13. The method of claim 1, further comprising:
performing said method in a stand-alone computerized application for creation of content-items as part of a process of creating or editing a content-item;
if the PAL score of the content-item is smaller than a pre-defined threshold value, then: generating a notification message in said stand-alone computerized application for creation of content-items, indicating that the content-item is predicted to have a high level of annoyance towards viewers.

14. The method of claim 1, further comprising:
performing said method in a cloud-based computerized application for creation of content-items as part of a process of creating or editing a content-item;
if the PAL score of the content-item is smaller than a pre-defined threshold value, then: generating a notification message in said cloud-based computerized application for creation of content-items, indicating that the content-item is predicted to have a high level of annoyance towards viewers.

15. The method of claim 1, further comprising:
automatically processing a batch of content-items that are stored in a repository of a Content Delivery Network (CDN) or of a cloud-based hosting service; wherein said processing comprises generating a PAL score for each of said content-items;
automatically generating a report listing content-items having a PAL score that is within a pre-defined range of PAL score values.

16. A non-transitory storage medium having stored thereon instructions that, when executed by one or more processors, cause the one or more processor to perform a method comprising:
processing content of a plurality of frames of a content-item, and determining a Predicted Annoyance Level (PAL) score that indicates a predicted level of annoyance that said content-item is predicted to cause viewers due to motion of content in said content-item;
wherein determining the predicted level of annoyance of said content-item is based on:
(i) a calculated percentage of similar area of content between consecutive frames of the content-item; and
(ii) a number of new objects that are introduced between consecutive frames of the content-item; and
(iii) a level of object motion between consecutive frames of the content-item; and
(iv) a quantification of a level of similarity between the first frame of the content-item and the last frame of the content item.

17. A system comprising:
one or more processors, operably associated with one or more memory units,
wherein the one or more processors are configured:
to process content of a plurality of frames of a content-item, and
to generate a Predicted Annoyance Level (PAL) score that indicates a predicted level of annoyance that said content-item is predicted to cause viewers due to motion of content in said content-item;
wherein the predicted level of annoyance of said content-item is generated based on:
(i) a calculated percentage of similar area of content between consecutive frames of the content-item; and
(ii) a number of new objects that are introduced between consecutive frames of the content-item; and
(iii) a level of object motion between consecutive frames of the content-item; and
(iv) a quantification of a level of similarity between the first frame of the content-item and the last frame of the content item.

* * * * *